US012686559B2

(12) United States Patent
Knoll, Jr.

(10) Patent No.: US 12,686,559 B2
(45) Date of Patent: Jul. 21, 2026

(54) WASTE DISPOSAL ROBOT, SYSTEM, AND METHOD

(71) Applicant: Knoll Robotics, Inc., Annapolis, MD (US)

(72) Inventor: Wayne K. Knoll, Jr., Annapolis, MD (US)

(73) Assignee: Knoll Robotics, Inc., Annapolis, MD (US)

( * ) Notice: Subject to any disclaimer, the term of this patent is extended or adjusted under 35 U.S.C. 154(b) by 36 days.

(21) Appl. No.: 18/800,235

(22) Filed: Aug. 12, 2024

(65) Prior Publication Data

US 2026/0042603 A1 Feb. 12, 2026

(51) Int. Cl.
  B65F 3/00 (2006.01)
  B65F 1/14 (2006.01)
  (Continued)

(52) U.S. Cl.
  CPC ........... B65F 3/005 (2013.01); B65F 1/1473 (2013.01); G05D 1/43 (2024.01); G05D 1/646 (2024.01); G06Q 10/1097 (2013.01); H02S 20/30 (2014.12); B65F 2210/168 (2013.01); B65F 2210/184 (2013.01); G05D 2105/14 (2024.01); G05D 2109/10 (2024.01); G06Q 10/30 (2013.01)

(58) Field of Classification Search
  CPC .. B65F 3/005; B65F 1/1473; B65F 2210/168; B65F 2210/184; G05D 1/43; G05D 1/646; G05D 2105/14; G05D 2109/10; G06Q 10/1097; G06Q 10/30; H02S 20/30
  See application file for complete search history.

(56) References Cited

U.S. PATENT DOCUMENTS 4,313,612 A * 2/1982 Rubens ..................... B62B 3/04
                                                  280/47.35
8,146,695 B1 * 4/2012 Ramshur .............. G05D 1/0265
                                                  318/587
(Continued)

FOREIGN PATENT DOCUMENTS

WO WO-2017220407 A1 * 12/2017 ............. B62D 15/00

OTHER PUBLICATIONS

Machine translation—WO2017220407 (Year: 2017).*

*Primary Examiner* — Scott A Browne
*Assistant Examiner* — Lidia Kwiatkowska
(74) *Attorney, Agent, or Firm* — Kilyk & Bowersox, P.L.L.C.

(57) ABSTRACT

A robot for waste disposal, the robot being configured to be secured to a garbage container. The robot includes a propulsion system, a control unit, a navigation system, and at least one power source. The control unit is configured to: store a scheduler event in the memory, the scheduler event including information pertaining to a day of the week and a time of the day; store a navigation instruction in the memory, the navigation instruction including at least a first route that begins at a first location and ends at a trash pickup location; and activate the propulsion system based on information provided by the navigation system to propel the garbage container along the first route of the navigation instruction such that the garbage container is propelled from the first location to the trash pickup location when the scheduler event occurs.

20 Claims, 7 Drawing Sheets

(51) Int. Cl.

| | |
|---|---|
| *G05D 1/43* | (2024.01) |
| *G05D 1/646* | (2024.01) |
| *G05D 109/10* | (2024.01) |
| *G06Q 10/109* | (2023.01) |
| *G06Q 10/30* | (2023.01) |
| *H02S 20/30* | (2014.01) |
| G05D 105/00 | (2024.01) |

(56)                         References Cited

U.S. PATENT DOCUMENTS

| | | | | |
|---|---|---|---|---|
| 9,446,510 | B2 | 9/2016 | Vu et al. | |
| 9,829,892 | B1 * | 11/2017 | Rodoni | G05D 1/0291 |
| 10,021,830 | B2 | 7/2018 | Doughty | |
| 10,481,607 | B2 * | 11/2019 | Dumitras | B65F 1/00 |
| 10,835,096 | B2 | 11/2020 | O'Dea et al. | |
| 10,857,925 | B1 * | 12/2020 | Sahota | G05D 1/0011 |
| 11,174,100 | B2 * | 11/2021 | Mallady | B65F 1/1468 |
| 12,084,824 | B2 * | 9/2024 | High | B66F 9/063 |
| 2008/0038102 | A1 * | 2/2008 | Murphy | B65F 1/1468 |
| | | | | 414/403 |
| 2008/0140253 | A1 * | 6/2008 | Brown | B65F 1/1638 |
| | | | | 701/23 |
| 2012/0041677 | A1 * | 2/2012 | D'Andrea | G05D 1/0246 |
| | | | | 701/527 |
| 2017/0330134 | A1 * | 11/2017 | Botea | G06Q 10/06314 |
| 2018/0079591 | A1 * | 3/2018 | Doty | B65F 3/00 |
| 2019/0033856 | A1 * | 1/2019 | Ferguson | G06Q 50/40 |
| 2019/0263644 | A1 * | 8/2019 | Atchley | E01H 5/061 |
| 2022/0219311 | A1 * | 7/2022 | Duthaler | G05D 1/645 |
| 2023/0391546 | A1 * | 12/2023 | Giacobbe | B65F 1/0053 |
| 2024/0074634 | A1 | 3/2024 | Jones et al. | |

* cited by examiner

WASTE DISPOSAL ROBOT, SYSTEM, AND METHOD

FIELD OF THE INVENTION

The present invention relates to waste disposal. The present invention also relates to garbage containers used for waste disposal.

BACKGROUND OF THE INVENTION

Household waste disposal typically begins with waste segregation, where residents separate their waste into categories such as recyclables (paper, plastic, glass), organic waste (food scraps, yard waste), and non-recyclables (general trash). This waste is then placed into designated garbage cans or containers, often color-coded to facilitate proper sorting (e.g., blue for recyclables, green for organic waste, and black for general trash). Municipal or private waste management services schedule regular pickups for these different types of waste, usually on a weekly or bi-weekly basis.

Prior to or on collection days, one of the household persons must bring the garbage can to a curb of the street. On collection days, garbage trucks make their rounds in neighborhoods to collect the contents of these containers. The collected waste is then transported to appropriate facilities: recyclables are taken to recycling centers where they are processed and reused; organic waste is taken to composting sites where it is converted into compost; and non-recyclable waste is taken to landfills or incineration plants for disposal. The household person must then bring the garbage can back to the household from the curb.

This system of using garbage cans and garbage trucks for waste disposal helps in maintaining cleanliness, promoting recycling, and managing waste efficiently. It relies on the cooperation of residents to properly segregate their waste and on waste management services to effectively collect and process the waste. However, as mentioned above, one the household persons must bring the garbage can to the curb and then bring the garbage can back to the household. Household persons may forget to bring the garbage can to the curb on or before the pickup day, and thus garbage may continue to collect in the household. Further, household persons may forget to bring the garbage can back from the curb, which may upset neighbors and could result in notices and/or fines.

Accordingly, there is a need for a waste disposal robot, system, and method that automatically drives garbage containers to the curb on or before collection days and automatically drives garbage containers back to a household after the garbage has been collected.

SUMMARY OF THE INVENTION

A feature of the present invention is to provide a garbage container system that automatically drives from a first location to a trash pickup location.

Another feature of the present invention is to provide a garbage container system that automatically drives from a first location to a trash pickup location prior to a scheduled trash pickup and automatically drives from the trash pickup location to the first location after trash has been emptied into a garbage truck.

A further feature of the present invention is to provide a robot that attaches to a garbage container and is capable of automatically driving the garbage container from a first location to a trash pickup location.

An additional feature of the present invention is to provide a robot that attaches to a garbage container and is capable of automatically driving the garbage container from a first location to a trash pickup location prior to a scheduled trash pickup and is capable of automatically driving the garbage container from the trash pickup location to the first location after trash has been emptied from the garbage container.

Additional features and advantages of the present invention will be set-forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a robot for waste disposal. The robot is configured to be secured to a garbage container. The robot includes a propulsion system configured to move the garbage container when the robot is secured to the garbage container. The robot further includes a control unit including a processor and a memory, the control unit being configured to control the propulsion system. A navigation system is in communication with the control unit. At least one power source is configured to power at least the propulsion system. The control unit is further configured to: store a scheduler event in the memory, the scheduler event including information pertaining to a day of the week and a time of the day, store a navigation instruction in the memory, the navigation instruction comprising at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

The present invention can also relate to a method for waste disposal. The method includes the following steps: securing a robot to a garbage container, the robot including a propulsion system, a control unit including a processor and a memory, a navigation system, and at least one power source; storing a scheduler event in the memory, the scheduler event including information pertaining to a day of the week and a time of the day; and storing a navigation instruction in the memory, the navigation instruction including at least a first route that begins at a first location and ends at a trash pickup location. The control unit activates the propulsion system based on information provided by the navigation system to propel the garbage container along the first route of the navigation instruction such that the garbage container is propelled from the first location to the trash pickup location when the scheduler event occurs.

The present invention can further relate to a waste disposal system. The waste disposal system includes a garbage container, a propulsion system configured for moving the garbage container, a control unit comprising a processor and a memory, the control unit being configured to control the propulsion system, a navigation system in communication with the control unit, and at least one power source. The control unit is further configured to: store a scheduler event in the memory, the scheduler event indicating a day of the week and a time of the day; store a navigation instruction in the memory, the navigation instruction including at least a first route that begins at a first location and ends at a trash pickup location; and activate the propulsion system based on information provided by the navigation system to propel the garbage container along the first route of the navigation instruction such that the garbage container is propelled from the first location to the trash pickup location when the scheduler event occurs.

It is to be understood that both the foregoing general description and the following detailed description are exemplary and explanatory only and intended to provide a further explanation of the present invention, as claimed.

BRIEF DESCRIPTION OF THE DRAWINGS

The invention may be more fully understood with reference to the accompanying drawings. The drawings are intended to illustrate, not limit, the present teachings, according to an embodiment of the present invention.

DETAILED DESCRIPTION OF THE INVENTION

Figure 1:
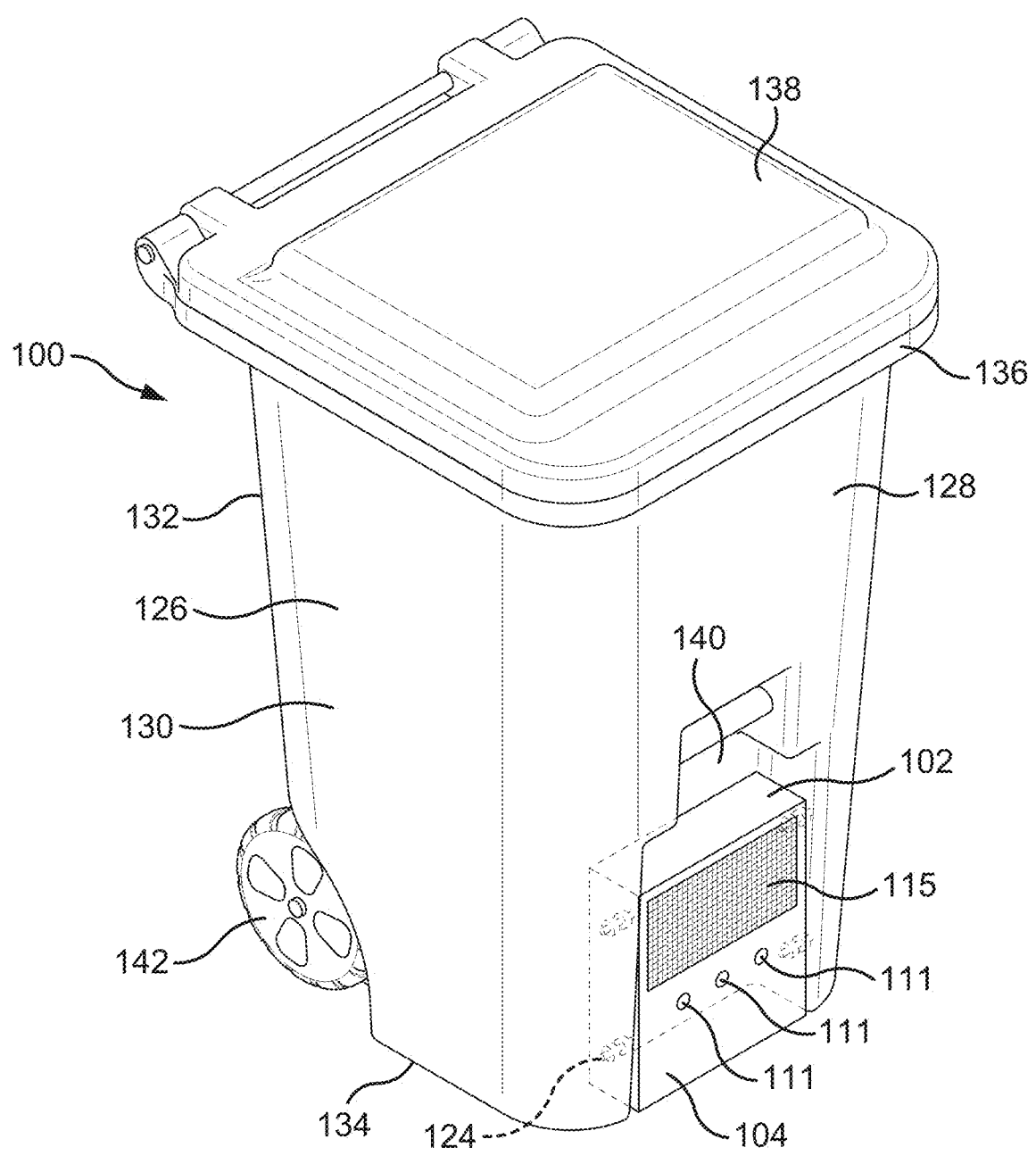
FIG. 1 is a perspective view of a waste disposal system of an embodiment of the present invention, illustrating an exemplary garbage container and an exemplary robot attached to the garbage container, the robot in a retracted position.

According to one or more embodiments, the present invention includes a robot for waste disposal. The robot includes a propulsion system, a control unit, a navigation system, and a power source. The robot is configured to be secured to a garbage container. The control unit is configured to: store a scheduler event on a memory, the scheduler event including information pertaining to a day of the week and a time of the day, store a navigation instruction in the memory, the navigation instruction including at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

According to one or more embodiments, the present invention includes a waste disposal system. The waste disposal system includes at least a garbage container, a propulsion system, a control unit, a navigation system, and a power source. The control unit is configured to: store a scheduler event in the memory, the scheduler event indicating a day of the week and a time of the day, store a navigation instruction in the memory, the navigation instruction including at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs. The waste disposal system can include any steps or features described herein.

The garbage container can be any type of garbage container that is placed at a trash pickup location where trash or recyclables from the garbage container are emptied into the garbage truck. For example, the garbage container can include a front wall, sidewalls, a rear wall, a bottom surface, and an open top that is closable by a lid. The garbage container can include two wheels connected by an axle. The two wheels can be situated at the intersection of the bottom surface and the rear wall. Alternatively, the garbage container can include a single sidewall that is tube shaped, a bottom surface, and an open top that is closable by a lid. The lid can be connected to the garbage container by a hinge, or can be separate from the garbage container.

The propulsion system can be any type of propulsion system that is capable of independently moving the garbage container along a paved lot or a driveway, such as an asphalt driveway, a gravel driveway, a concrete driveway, or the like. The propulsion system can be further capable of driving the garbage container through grass, light snow, rain, or other inclement weather. The propulsion system can include wheels, a track, treads, tires, rollers, brushes, rims, combinations thereof, and the like. The propulsion system can include a wheel module, a set of wheels, a plurality of wheels, a single axis, multiple axes, combinations thereof, and the like. The wheels can be capable of steering, and thus can pivot from side to side. The propulsion system further includes a motor and a drive train that is operatively connected to the wheels.

The control unit includes at least one processer and at least one memory. The control unit can be a high-performance central processing unit (CPU) or a combination of CPUs and graphics processing units (GPUs), which handle complex computations required for tasks such as sensor fusion, object detection, path planning, and decision making. The processors can be supported by RAM and fast solid-state drives (SSDs) to store and quickly access the data needed for real-time processing.

The control unit can integrate with an array of sensors, including LiDAR, radar, cameras, and ultrasonic sensors, which provide a comprehensive view of the surroundings of the robot. The control unit can further include specialized hardware accelerators, such as field-programmable gate arrays (FPGAs) and application-specific integrated circuits (ASICs), to enhance the speed and efficiency of specific tasks, such as image recognition and data processing from the sensors. Connectivity hardware, including Ethernet ports and wireless communication modules, allows the control unit to communicate with other systems within the robot and external infrastructure.

The present invention can include one or more sensors configured to send signals to the control unit. The one or more sensors can include a light sensor, a weight sensor, a motion sensor, a magnetic sensor, a sound sensor, a radio sensor, a wheel encoder, or a combination thereof. The navigation system can include the one or more sensors.

The light sensor can be used to perceive and interact with the environment. The light sensor can include photodiodes, such as silicon and avalanche photodiodes, which convert light into electrical current. The light sensor can include phototransistors, including NPN and PNP types. The sensors can include Light Dependent Resistors (LDRs) and photo-resistors. Photovoltaic cells, such as solar cells, can also be used, which generate voltage when exposed to light and can be used in solar-powered robots or as light sensors.

The present invention can include advanced light sensors, such as charge-Coupled Devices (CCDs) and Complementary Metal-Oxide-Semiconductor (CMOS) sensors, which are used in cameras to convert light into electrical signals. The present invention can include infrared photodiodes and phototransistors that detect infrared light and can be used for obstacle detection, proximity sensing, and IR communication. Passive Infrared (PIR) sensors detect heat emitted by objects and can be used for motion detection. Laser rangefinders, such as LiDAR (Light Detection and Ranging), use laser pulses to measure distance, creating detailed maps of surroundings, which can be used for navigation and mapping.

Color sensors, such as RGB sensors, can be used to detect and measure the intensity of red, green, and blue light, enabling applications requiring color recognition. Ultraviolet (UV) sensors, such as UV photodiodes, detect ultraviolet light for applications requiring UV light detection. Multi-spectral sensors, including multispectral cameras, capture data at different wavelengths for detailed analysis of light properties. Time-of-Flight (ToF) sensors measure the time it takes for light to travel to an object and back, providing accurate distance measurement and 3D mapping capabilities.

Weight sensors, also known as load cells, can be used for measuring force, weight, or load. Strain gauge load cells utilize strain gauges attached to a metal body that deforms under weight, changing the electrical resistance in proportion to the load applied. Capacitive load cells measure changes in capacitance between two plates as they move closer or further apart under load. Piezoelectric load cells generate an electrical charge when subjected to force or weight, making them suitable for dynamic force measurements and environments with rapid load changes. Hydraulic load cells measure weight through the pressure change in a fluid within the sensor. Pneumatic load cells operate similarly but use air pressure changes to measure weight.

Motion sensors can include Inertial Measurement Units (IMUs) that combine accelerometers and gyroscopes to measure linear acceleration and angular velocity, respectively. This allows the robot to maintain balance, navigate, and track the orientation in three-dimensional space. Infrared (IR) sensors detect motion by emitting infrared light and measuring the reflection from objects. These sensors can be used for proximity detection, obstacle avoidance, and simple gesture recognition. Passive Infrared (PIR) sensors detect the infrared radiation emitted by warm objects for detecting human or animal presence. Ultrasonic sensors use sound waves to detect motion and measure distance by emitting high-frequency sound waves and listening for their echo. The ultrasonic sensor can be used for obstacle detection and distance measurement in various environmental conditions. Optical flow sensors measure the motion of objects or surfaces within a visual scene by detecting the movement of pixel patterns.

The navigation system enables the robot to reach the destinations without human intervention. For example, the navigation system can navigate pre-programmed navigation data, determine its position, autonomously plan paths, avoid obstacles, and the like. The navigation system can utilize machine learning and artificial intelligence to update the navigation instructions, avoid obstacles and return to the path, and determine an optimal path. The navigation system can include the one or more sensors, such as, but not limited to, the light sensor, the magnetic sensor, the radio sensor, the wheel encoder, other sensors described herein, or a combination thereof. The navigation system can include a global positioning system receiver by itself or in combination with the one or more sensors.

The present invention can further include at least one wireless communication unit. The wireless communication unit can be a wireless network adapter, Bluetooth, a cellular adapter, or a combination thereof. Wireless communication units can enable the robot to exchange data, receive commands, and interact with other devices or networks without physical connections.

As an option, the present invention can utilize one or more wireless repeaters that are situated along a driveway. The wireless repeaters can be used to ensure that the robot maintains a connection with the Internet of the dwelling via the wireless network adapter.

As an option, the present invention can include a manual mode. The manual mode can allow a user to control the robot, and thereby control the garbage container via a remote controller. The remote controller can be a designated remote controller including joy sticks and buttons to control the robot. As an option, the remote controller can be a smart device, such as a smart phone or tablet, which wirelessly connects to the robot using an application loaded on a memory of the smart device. Thus, the user can control the propulsion system of the robot using a touch screen of the smart device.

The control unit is configured to store a scheduler event on the memory, the scheduler event including data that indicates a day of the week and a time of the day. The control unit can include a timer that recognizes when the scheduler event occurs. As an option, the robot can include a user interface, such as a touch screen, voice command, a combination thereof, or the like, that receives an input from the user. For example, a user can utilize the user interface to select a day of the week and the time of the day, and the selection can be stored in the memory.

As an option, the scheduler event is received via the at least one wireless communication unit. For example, a user may utilize the smart device having the application loaded on the memory of the smart device. Using the application, the user can select a day and a time of the day. The selection data is transferred from a wireless communication unit of the smart device to the wireless communication unit of the robot, and/or over a wireless network. The communication of the smart device and the robot can be via a network adapter (Wi-Fi), cellular adapters, or the like.

As an option, the robot can communicate with a waste disposal service system over the Internet. The waste disposal service system can automatically update the control unit with the day and the time of day. For example, the robot can connect with the Internet using the network adapter or the cellular adapter, and can communication with the waste disposal service system over the Internet. The waste disposal service system can send the robot a day for trash collection. The control unit of the robot can then determine a scheduler event based on the day for trash collection. The waste disposal service system can also update the robot regarding missed or changed trash days due to inclement weather or holidays so that the garbage container does not go to the trash pickup location when the garbage trucks are not on their routes.

As an example, the day for trash collection can be a Monday and thus the scheduler event is based on the trash collection day of Monday. The scheduler event can then be programmed for 1 am on Monday morning. Thus, at 1 am on Monday morning, the schedular event occurs, and the control unit activates the propulsion system to drive the garbage container along the first route of the navigation instruction such that the garbage container drives from the first location to the trash pickup location.

The first location can be at or adjacent to a dwelling, such as a house, townhouse, condominium, or the like. As an option, the first location can be in a garage. When the schedule event occurs, the garage door can automatically open via a timer, or the robot can communicate with a wireless module of the garage door system to activate the garage door to open, and allow the garbage container to traverse out of the garage. Alternatively, the first location can be at a place of business, such as a building, mall, strip mall, or the like. The trash pickup location can be anywhere along a garbage truck pickup route. For example, the trash pickup location can be at a curb, a sidewalk, an end of a driveway, a side of a road, a parking lot, or the like.

For safety reasons, the propulsion system can drive the garbage container at a relatively slow speed. For example, the propulsion system can drive the garbage container at 4 mph, 3 mph, 2 mph, 1 mph, 0.75 mph, 0.5 mph, 0.25 mph or less than 0.25 mph. The control unit can determine a scheduler event based on the day for trash pickup, the speed set for the propulsion system, and the distance of the first route to ensure that the garbage container is at the trash pickup location for trash or recyclable collection by the garbage truck, either once or twice a week, depending on the schedule of the garbage collection. The scheduler event is programmed to activate repeatedly once or twice a week, unless otherwise programmed.

The control unit is further configured to store a navigation instruction on the memory, the navigation instruction including a first route that begins at a first location and ends at a trash pickup location. The navigation instruction can be pre-programmed, received, and stored in the memory of the control unit. For example, the navigation instruction can be determined on a separate computing system and sent to the robot via wireless communication.

As an option, the control unit of the robot can determine the navigation instruction. For example, the control unit can determine the navigation instruction using a global positioning system using GPS coordinates and/or by the one or more sensors.

As an option, the navigation system includes the one or more sensors and uses the sensors to generate the navigation instruction. For example, the one or more sensors can include at least one of the light sensor, the magnetic sensor, the radio sensor, and the wheel encoder. The one or more sensors can use the light sensor and/or the radio sensor to map a navigation instruction visually or using radio signals.

For example, a start input can be received, which indicates the first location. The garbage container can be manually moved along the first route one or more times, and the end input can be received where the first route ends, i.e. the trash pickup location. The control unit can learn the navigation instruction using the sensors.

As an option, the present invention can utilize a magnetic sensor. A plurality of magnetic markers can be placed along the first route and the control unit can sense the plurality of magnetic markers along the route and follow a pathway from the first location to the trash pickup location.

The present invention can utilize radio frequency sensors. A plurality of Radio Frequency Identification (RFID) tags can be placed along the first route and the control unit can sense the RFID tags along the route and follow a pathway from the first location to the trash pickup location.

The present invention can utilize a light emitter and sensor to sense the path from the first location to the trash pickup location. For example, an infrared paint can be used to paint a path from the first location to the trash pickup location. The robot can emit an infrared light and the infrared paint can reflect the infrared light back to the light sensor. The robot can follow the path of the infrared paint from the first location to the trash pickup location.

The present invention can also utilize a wheel encoder to determine the navigation instruction. The wheel encoder is a precise measurement of wheel rotation, and can be used to accurately track the position, speed, and direction of the robot.

As an option, the navigation system can utilize more than one input to determine an optimal navigation instruction. For example, the navigation system can utilize the global positioning system, as well as light sensors, motion sensors, or any sensor described herein to determine the navigation instruction.

The navigation instruction can further include a second route from the trash pickup location to the first location. The control unit is further configured to activate the propulsion system to drive the garbage container along the second route of the navigation instruction such that the garbage container drives from the trash pickup location to the first location when a return event occurs. The second route can be determined in the same manner for the first route as described herein, using a pre-programmed navigation instruction, one or more sensors, and/or using a global positioning system.

As an option, the return event is a second scheduler event that indicates a day of the week and a time of the day. At least the time of the second scheduler event is different than the time of the scheduler event. For example, if the garbage truck has a pickup day of Monday, the second scheduler event can be at 10 pm on Monday. Once the second scheduler event occurs, the control unit can activate the propulsion system based on information provided by the navigation system to propel the garbage container along the second route of the navigation instruction such that the garbage container is propelled from the trash pickup location to the first location when the return event occurs.

As an option, the return event occurs when a threshold motion is detected by a motion sensor. A certain motion sensitivity threshold can be stored on the memory of the control unit. The motion sensor can be activated once the garbage container has reached the curb. A motion sensitivity threshold is utilized to prevent a return event from occurring prematurely. For example, if the garbage container is moved but not emptied, a motion sensitivity threshold is not achieved and the return event does not occur. However, when the garbage container is emptied into a garbage truck, the motion sensitivity threshold is achieved, and thus the return event occurs. Once the return event occurs, the control unit activates the propulsion system based on information provided by the navigation system to propel the garbage container along the second route of the navigation instruction such that the garbage container is propelled from the trash pickup location to the first location when the return event occurs.

As an option, the return event occurs when a threshold weight is detected by a weight sensor. A certain maximum weight threshold can be stored on the memory of the control unit. The weight sensor can be activated once the garbage container has reached the curb. The threshold weight sensor can sense a total weight of the garbage container with trash or recyclables or a weight of the trash or recyclables within the garbage container. Accordingly, when the garbage container is emptied into a garbage truck, the control unit can detect that the garbage or recyclables are no longer within the garbage container and the return event occurs. Once the return even occurs, the control unit activates the propulsion system based on information provided by the navigation system to propel the garbage container along the second route of the navigation instruction such that the garbage container is propelled from the trash pickup location to the first location when the return event occurs.

The return event can occur after a delay time following the detection of the motion sensitivity threshold and/or the maximum weight threshold. For example, the detection can occur by the sensors, and then after 30 seconds, 1 minute, 5 minutes, 30 minutes, an hour or longer, the return event occurs and the control unit activates the propulsion system based on information provided by the navigation system to propel the garbage container along the second route of the navigation instruction such that the garbage container is propelled from the trash pickup location to the first location when the return event occurs. The delay time can be pre-programmed or set by a user interface and stored on the memory of the control unit.

As an option, the garbage container can include a first set of wheels and the propulsion system can include a second set of wheels. As an option, the garbage container can include no wheels, and the propulsion system can include all of the wheels.

As an option, the wheels of the garbage container can be replaced by the robot. For example, the robot can be part of a set of wheels. The robot can replace the wheels of the garbage container. In such embodiments, the original wheels of the garbage container are removed, and the robot, including wheels, replaces the original wheels of the garbage container.

The propulsion system, the navigation system, and the control unit can be part of a robot that is secured to the garbage container. Additionally, the robot can include the one or more sensors and the wireless communication unit described herein. The robot can be either be permanently affixed to the garbage container or releasably attached to the garbage container. The robot can be attached to a bottom surface of the garbage container and/or one of the walls of the garbage container.

As mentioned above, the garbage container can include a front wall, sidewalls, a rear wall, a bottom surface, and an open top that is closable by a lid. A channel extends in a direction from the bottom surface to the open top. The robot can be secured within the channel. The robot can be fixed to the garbage container within the channel via bolts, screws, nuts, straps, and the like.

As an option, a locking bracket can releasably secure the robot within the channel. For example, a male locking bracket can be secured to one of the robot and the garbage container, and a female locking bracket can be secured to the other of the robot and the garbage container. The female locking bracket releasably secures to the male locking bracket, thus releasably securing the robot to the garbage container.

The garbage container can include a first set of wheels, and the robot can include a second set of wheels. The second set of wheels can be operatively connected to an actuator, such that the second set of wheels includes a deployed position and a retracted position. The deployed position includes the second set of wheels in contact with a ground and the retracted position includes the second set of wheels elevated above the ground. The control unit can activate the second set of wheels to the deployed position when the propulsion system is activated, which can reduce the space of the robot and protect the robot when the propulsion system is not in use.

The control unit causes the actuator to deploy the second set of wheels to the deployed position when the scheduler event occurs, such that the propulsion unit drives the wheels and thus drives the garbage container to the curb. Once the garbage container reaches the curb, the control unit can retract the second set of wheels to the retracted position. The control unit can then deploy the second set of wheels to the deployed position when the return event occurs, such that the propulsion unit drives the wheels and thus drives the garbage container back to the first location. Once the garbage container reaches the first location, the control unit can retract the second set of wheels to the retracted position.

The power source can include a battery. As an option, the robot can include a solar panel disposed on an out surface of the robot. The solar panel can be used to charge the battery. Thus, when sunlight hits the solar panel, the solar panel can convert the solar energy to electrical energy which is stored on the battery.

As an option, the present invention can include a docking station that can connect with and charge the battery. When the garbage container is located at the first location, the garbage container and robot can be situated on the docking station, which automatically charges the battery. The docking station can be connected to an outlet of the dwelling. As an option, the docking station can utilize radio frequency coils to wireless charge the battery of the robot.

The present invention can utilize the one or more sensors to determine whether the garbage container has been knocked over or is in a position in which it is stuck or otherwise cannot move. For example, the one or more sensors can determine that the garbage container is knocked over on its side, and can utilize the wireless communication unit to send a signal to a user's smart device to notify the user that the garbage container needs to be picked back up in the upright position. Similarly, the one or more sensors can determine that the propulsion system can no longer move the garbage container, and can utilize the wireless communication unit to send a signal to a user's smart device to notify the user that the garbage container is stuck or that the robot is not operating correctly.

The present invention can include a security system. For example, when the control unit determines that the robot is at location that is not on route, at the first location, or at the pickup location, the robot can utilize the wireless communication unit to send a signal to a user's smart device to notify the user that the robot is in an unauthorized area, and can further send the user's smart device the location of the robot. As an option, when the robot detects that the robot is in an unauthorized area, the robot can no longer function.

Additionally, the robot can be used to monitor the household or business. For example, the robot can utilize a camera and can face the household or business for increased security.

When a household or business uses more than one garbage containers that need to be brought to the curb on the same day, each of the garbage containers can include a respective robot. As an option, the more than one garbage containers can utilize a single robot on one of the garbage containers, and a remainder of the garbage containers can be connected to one another by daisy chaining. For example, the garbage containers can be connected together via ropes, hooks, loops, chains, and/or other connectors.

The robot of the present invention can be considered an autonomous robot. The autonomous robot can include pre-programmed instructions and/or can utilize machine learning and artificial intelligence to create its own instructions and/or update pre-programmed instructions.

The present invention can further include a method for waste disposal. The method can include: securing a robot to a garbage container, the robot including a propulsion system, a control unit including a processor and a memory, a navigation system, and at least one power source; storing a scheduler event on the memory, the scheduler event indicating a day of the week and a time of the day; and storing a navigation instruction on the memory, the navigation instruction including at least a first route from a dwelling to a curb of a street. The control unit activates the propulsion system and the navigation system to drive the garbage container along the first route of the navigation instruction such that the garbage container drives from the dwelling to the curb when the scheduler event occurs. The method can include any steps or features described herein.

Components, machines, systems, and methods related to robots, which can be used in or as a part of the present invention, include those described in WO2017220407A1 to Guhl, U.S. Pat. No. 9,446,651 B2 to Vu et al., U.S. Pat. No. 10,021,830 B2 to Doughty, and U.S. Pat. No. 10,835,096 B2 to O'Dea et al., each of which is incorporated herein by reference in its entirety.

Figures 2, 3:
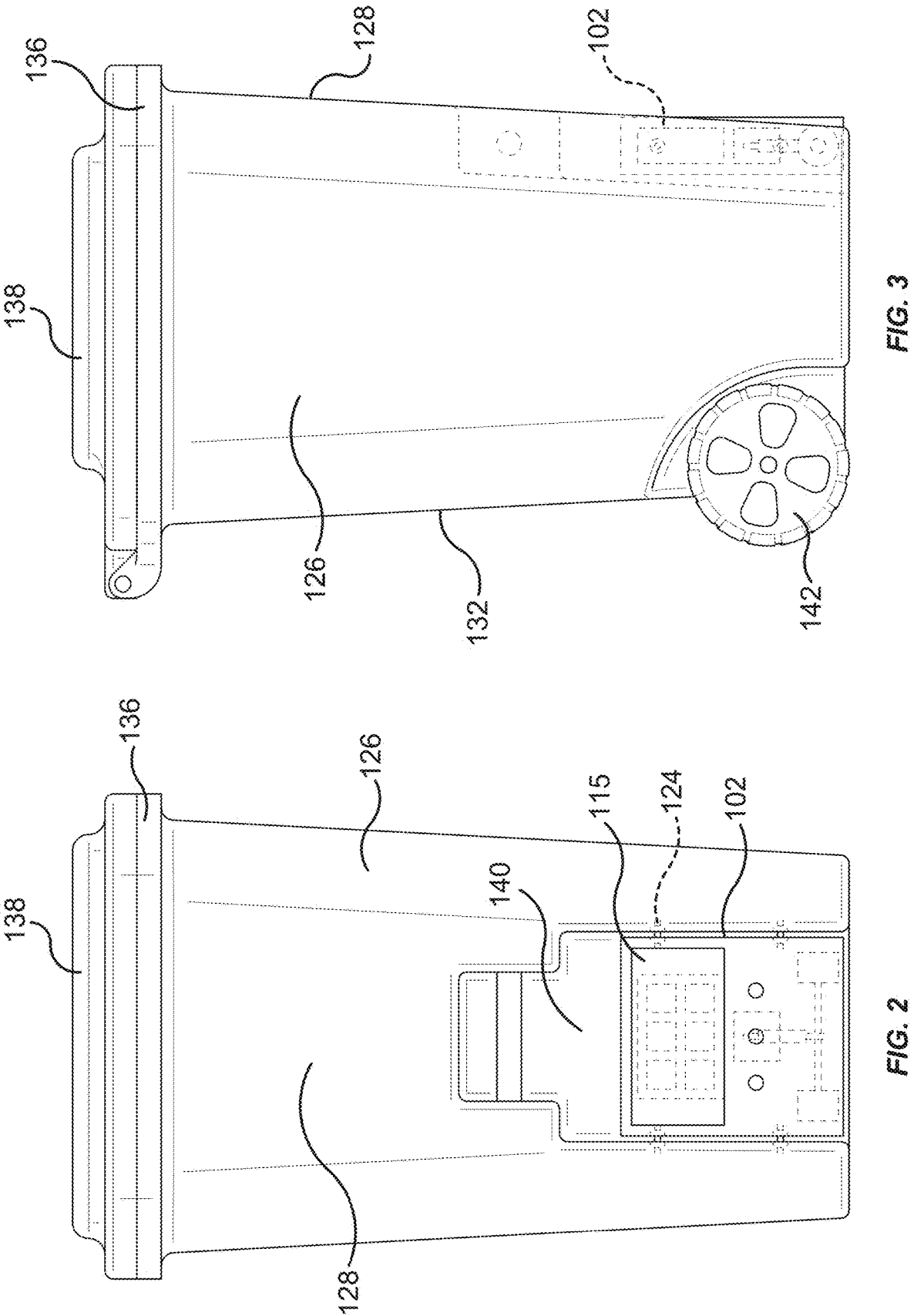
FIG. 2 is a front view of the waste disposal system of FIG. 1.
FIG. 3 is a side view of the waste disposal system of FIG. 1.
Figure 5:
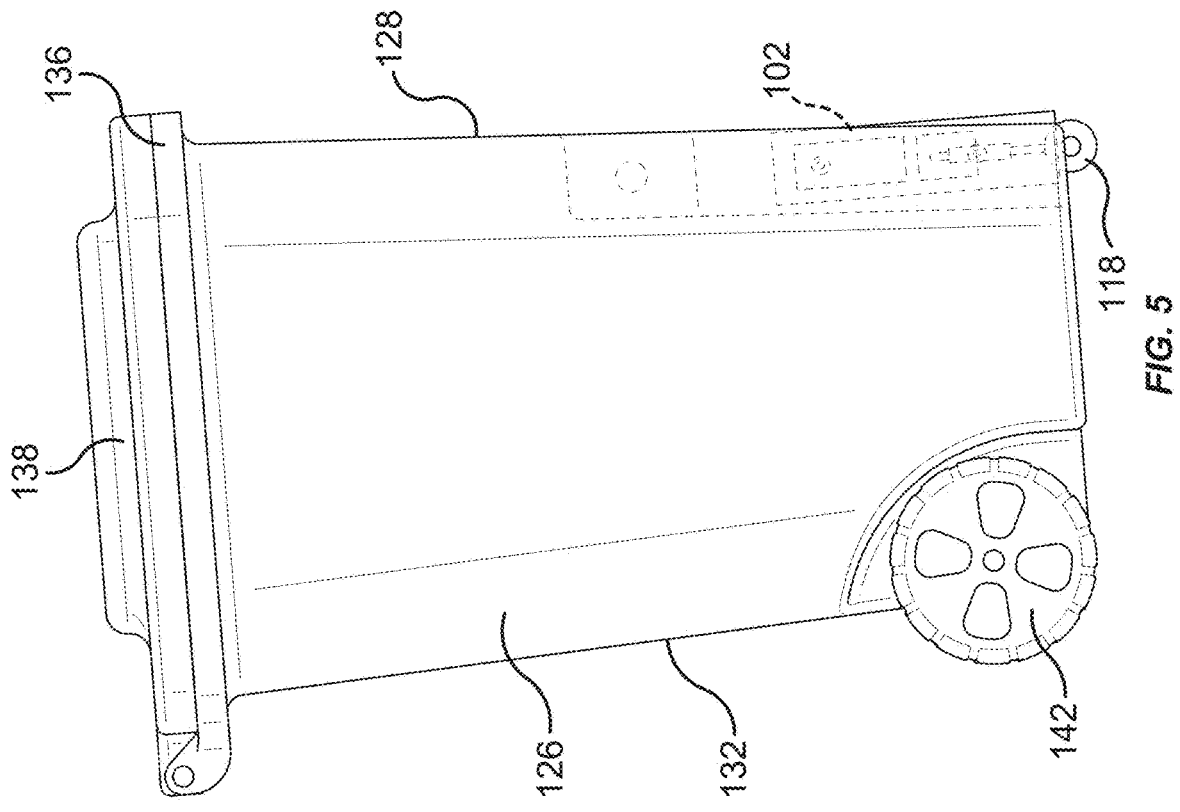
FIG. 5 is a side view of the waste disposal system of FIG. 1, illustrating the robot in the deployed position.
Figure 4:
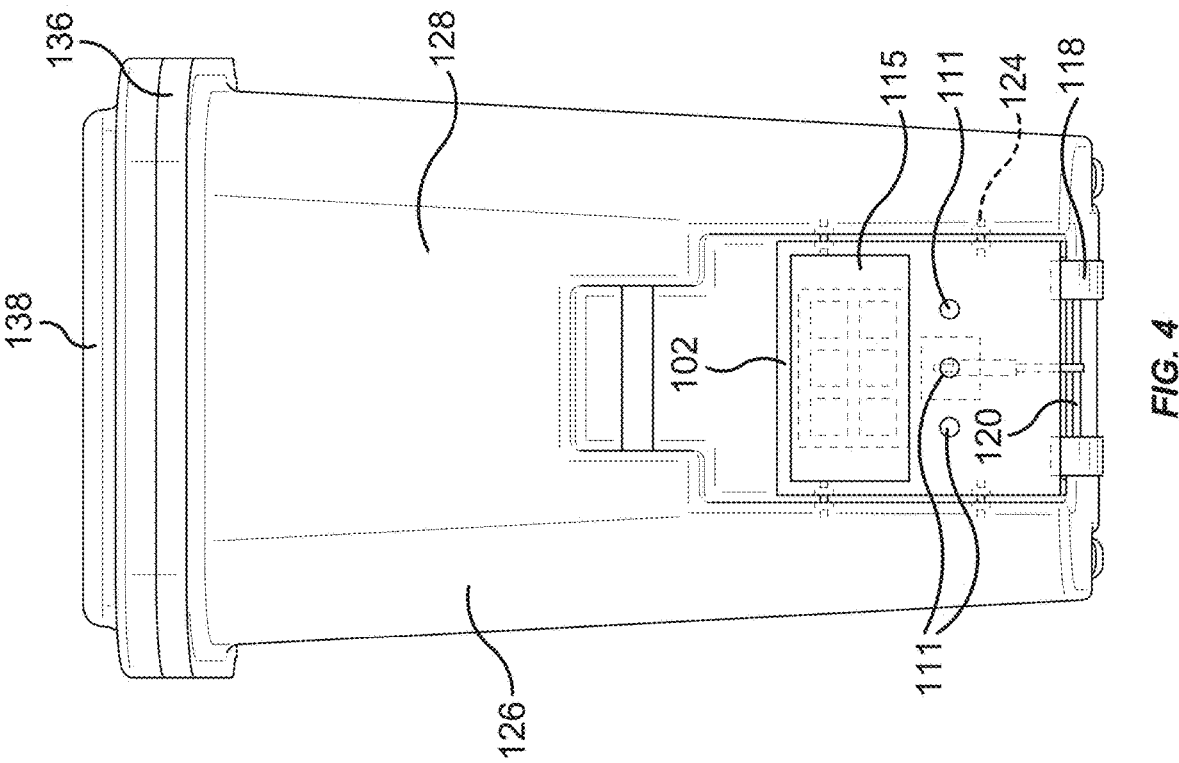
FIG. 4 is a front view of the waste disposal system of FIG. 1, illustrating the robot in a deployed position.
Figure 7:
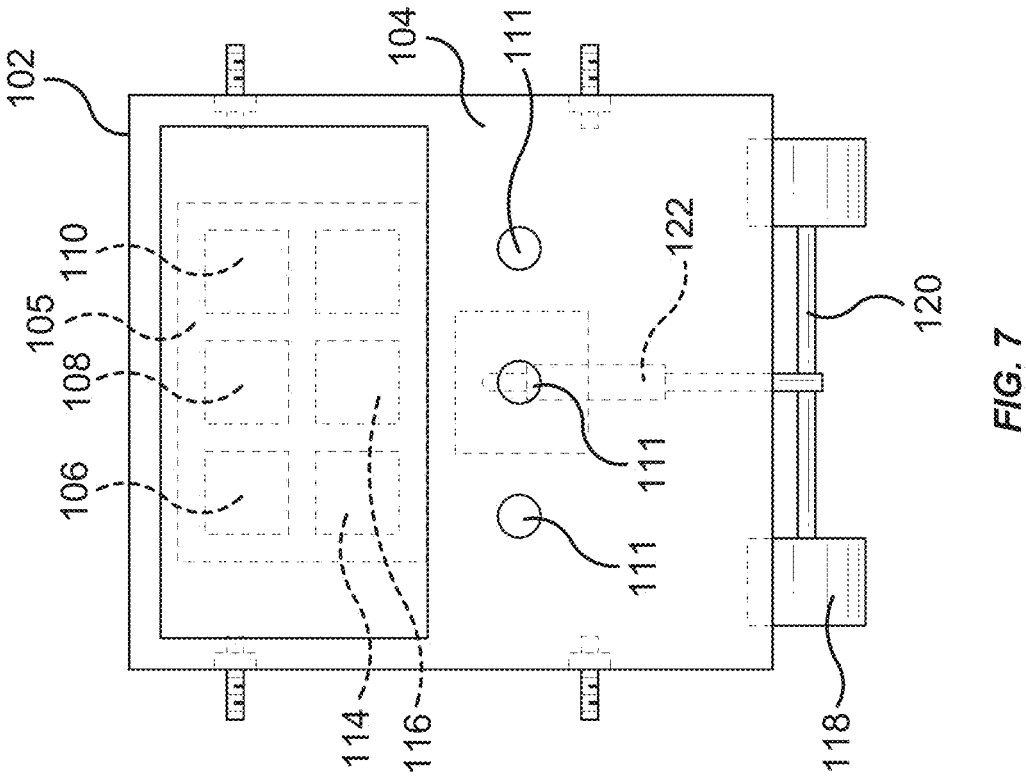
FIG. 7 is a front view of a robot of the waste disposal system of FIG. 1, illustrating the robot in a deployed position.
Figure 6:
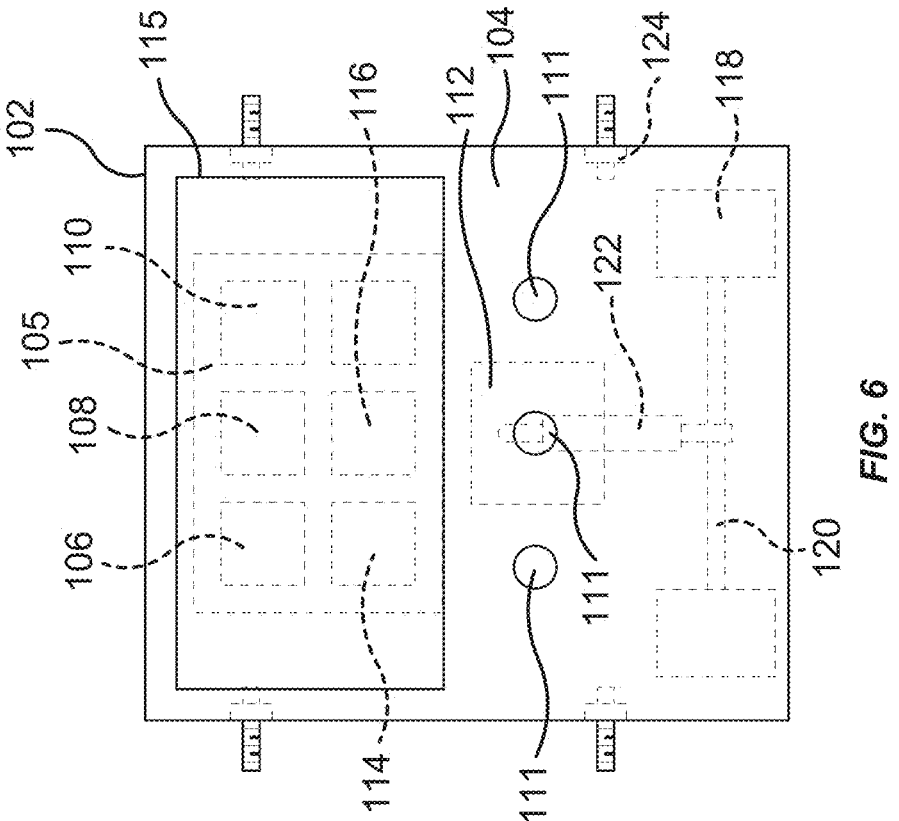
FIG. 6 is a front view of a robot of the waste disposal system of FIG. 1, illustrating the robot in a retracted position.
Figure 8:
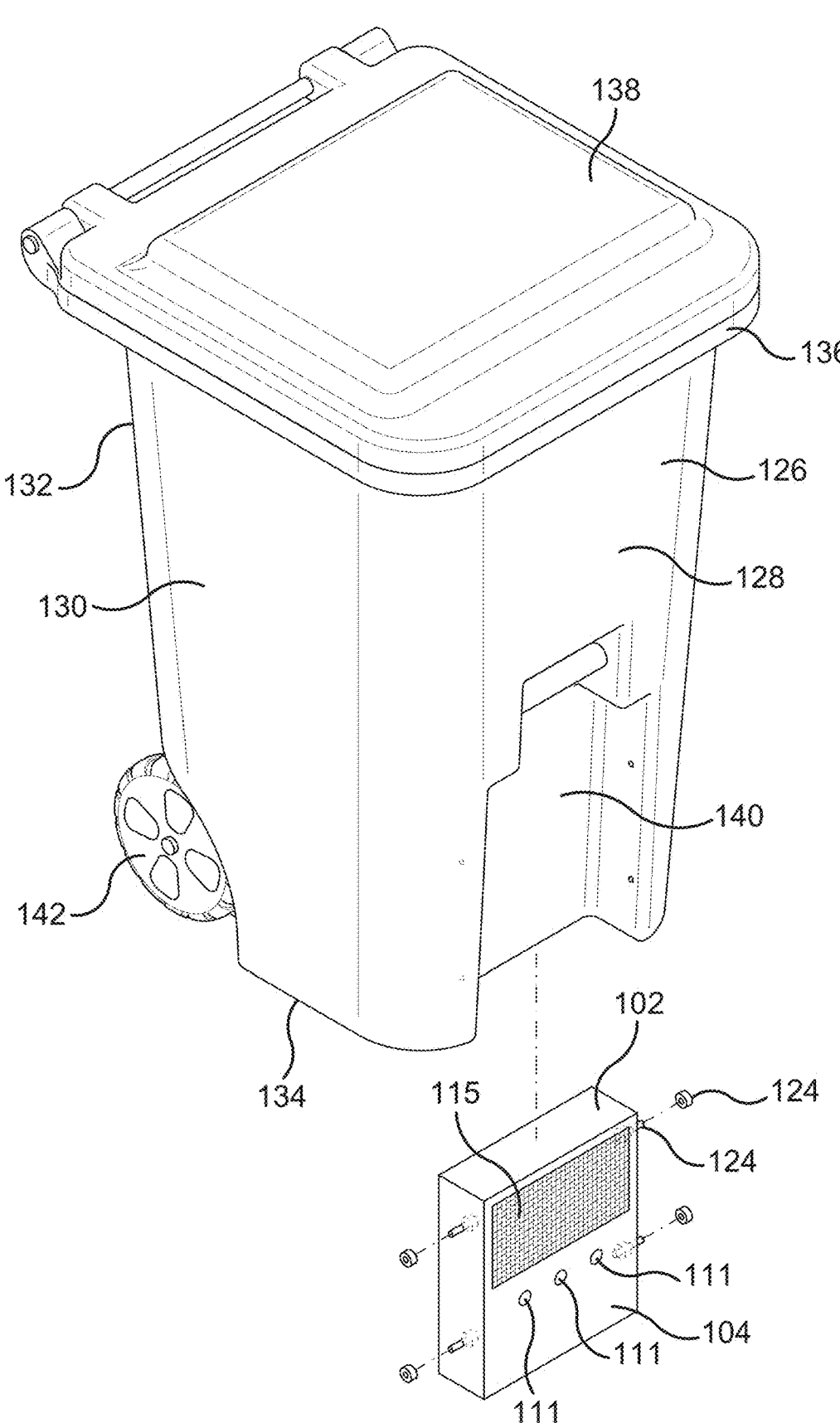
FIG. 8 is an exploded perspective view of the waste disposal system of FIG. 1.

With reference now to the drawings, FIG. 1 is a perspective view of a waste disposal system 100 of an embodiment of the present invention, illustrating a garbage container 126 and a robot 102 in a retracted position. FIG. 2 is a front view of waste disposal system 100 of FIG. 1, illustrating garbage container 126 and robot 102 in a retracted position. FIG. 3 is a side view of waste disposal system 100 of FIG. 1, illustrating garbage container 126 and robot 102 in the retracted position. FIG. 4 is a front view of waste disposal system 100 of FIG. 1, illustrating garbage container 126 and robot 102 in a deployed position. FIG. 5 is a side view of waste disposal system 100 of FIG. 1, illustrating garbage container 126 and robot 102 in the deployed position. FIG. 6 is a front view of robot 102 of waste disposal system 100 of FIG. 1, illustrating robot 102 in a retracted position. FIG. 7 is a front view of robot 102 of waste disposal system 100 of FIG. 1, illustrating robot 102 in a deployed position. FIG. 8 is an exploded perspective view of waste disposal system 100 of FIG. 1, illustrating garbage container 126 and robot 102 in the retracted position.

FIGS. 1-8 illustrate robot 102 of an embodiment of the present invention. Robot 102 includes a housing 104 that houses internal components of robot 102. A locking bracket 124 can be used to secure housing 104 to a garbage container 126. Robot 102 further includes a main board 105 within housing 104. A control unit 106 including a processor and a memory, a navigation system 108, and a wireless communication unit 116 can be electrically connected to main board 105, and can be in communication with one another.

The present invention can include internal sensors 110 and external sensors 111. The internal sensors 110 and external sensors 111 are configured to send signals to control unit 106. The external sensors 111 can include a light sensor, a sound sensor, a radio sensor, any of the sensors described herein, or a combination thereof. The internal sensors 110 can include a weight sensor, a motion sensor, a magnetic sensor, a wheel encoder, any of the sensors described herein, or a combination thereof. Internal sensors 110 can be housed within housing 104 and external sensors 111 can be secured to an outer surface of housing 104. Navigation system 108 can include the one or more of internal sensors 110 and external sensors 111 and/or can include a global positioning system receiver. Wireless communication unit 116 can include a wireless network adapter, Bluetooth, a cellular adapter, or a combination thereof.

Robot 102 can further include a propulsion system 112. A power source 114 can also be connected to the main board 105 and can provide power to control unit 106, navigation system 108, internal sensors 110, external sensors 111, propulsion system 112, and wireless communication unit 116. Robot 102 can further include a solar panel 115 attached to an outer surface of housing 104 that electrically charges power source 114, such as a battery.

Propulsion system 112 can include a motor and drive train operatively connected to a set of wheels 118. The set of wheels 118 are coupled to an axle 120. The set of wheels 118 or axle 120 are configured to pivot side by side for steering robot 102. An actuator 122 is operatively connected to wheels 118. Actuator 122 is configured to extend wheels 118 into a deployed position and retract wheels 118 into a retracted position. FIGS. 1-3, 6, and 8 illustrate robot 102 in a retracted position while FIGS. 4, 5, and 7 illustrate robot 102 in a deployed position.

Garbage container 126 includes a front wall 128, side-walls 130, a rear wall 132, a bottom surface 134, a top 136, an openable and closable lid 138, and a set of wheels 142. Front wall 128 includes a channel 140 extending in a direction from bottom surface 134 to top 136. Robot 102 is secured within channel 140 by locking bracket 124. As illustrated, locking bracket 124 includes bolts and nuts that secure robot 102 to garbage container 126.

Control unit 106 is configured to store a scheduler event and a return event in the memory. The scheduler event includes information pertaining to a day of the week and a time of the day. The return event can be a second scheduler event including information pertaining to a day of the week and a time of the day, where at least the time of the second scheduler event is different than the time of the scheduler event. The return event can be activated based on a motion sensor of internal sensors 110 and/or external sensors 111. Motion sensor detects motions that exceed a motion sensitivity threshold, and the return event occurs after a delay time following detection, by the motion sensor, of a motion that exceeds the motion sensitivity threshold. The return event can be activated based on a weight sensor of internal sensors 110 and/or external sensors 111. Weight sensor detects a maximum weight threshold, and the return event occurs after a delay time following detection, by the weight sensor, of a weight that is below the maximum weight threshold.

Control unit 106 is further configured to store a navigation instruction in the memory, the navigation instruction including a first route that begins at a first location and ends at a trash pickup location and a second route that begins at the trash pickup location and ends at the first location. The navigation instruction can be determined by navigation system 108. For example, navigation system 108 can include a global positioning system receiver that receives and saves coordinates of garbage container 126. Navigation system 108 can utilize internal sensors 110 and/or external sensors 111 to navigate the first route and the second route. Further, internal sensors 110 and/or external sensors 111 can be used to generate the navigation instruction, as described herein.

Control unit 106 is further configured to activate actuator 122 to extend set of wheels 118 into the deployed position and activate propulsion system 112 based on information provided by navigation system 108 to propel garbage container 126 along the first route of the navigation instruction such that garbage container 126 is propelled from the first location to the trash pickup location when the scheduler event occurs. Control unit 106 can then retract set of wheels 118 into the retracted position when garbage container 126 reaches the trash pickup location, Once the garbage truck empties the trash from garbage container 126 and the return event occurs, control unit 106 is further configured to extend set of wheels 118 to the deployed position and activate propulsion system 112 based on information provided by navigation system 108 to propel garbage container 126 along the second route of the navigation instruction such that garbage container 126 is propelled from the trash pickup location to the first location. Control unit 106 can then retract set of wheels 118 into the retracted position when garbage container 126 returns to the first location.

Figure 10:
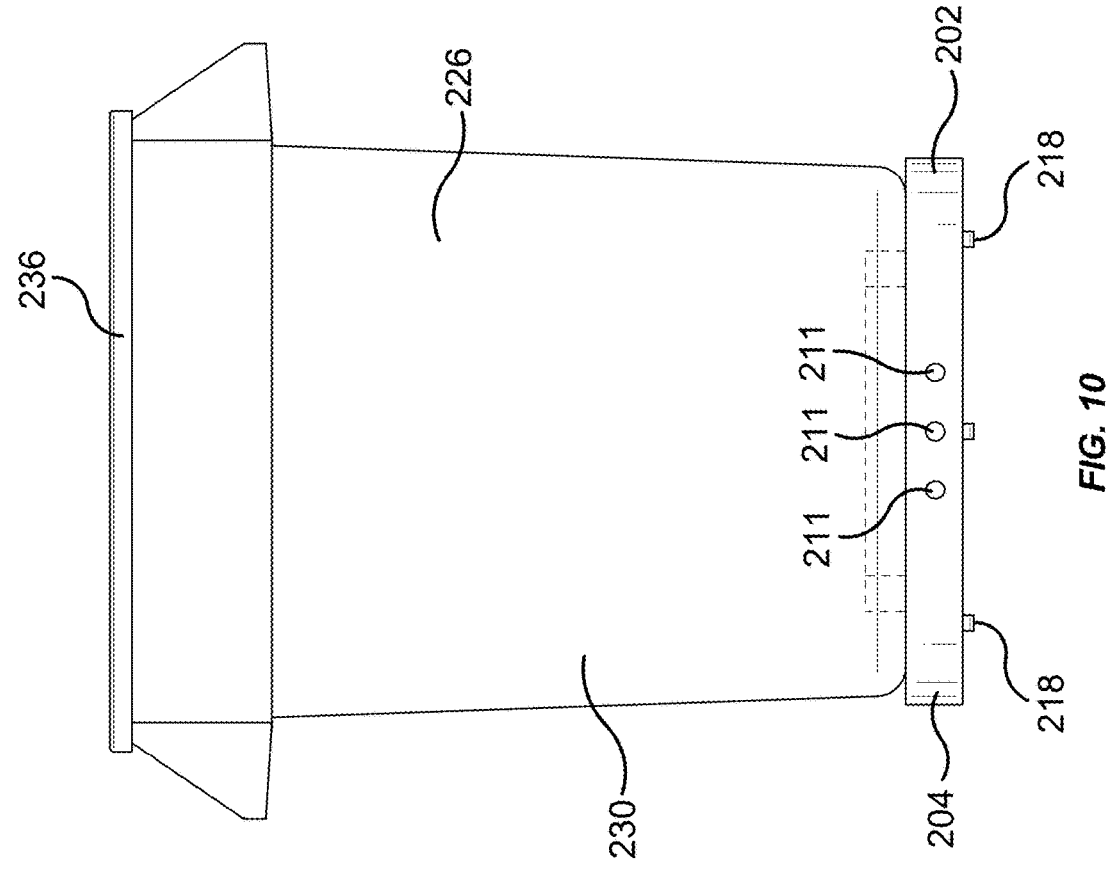
FIG. 10 is a front view of the waste disposal system of FIG. 9.
Figure 9:
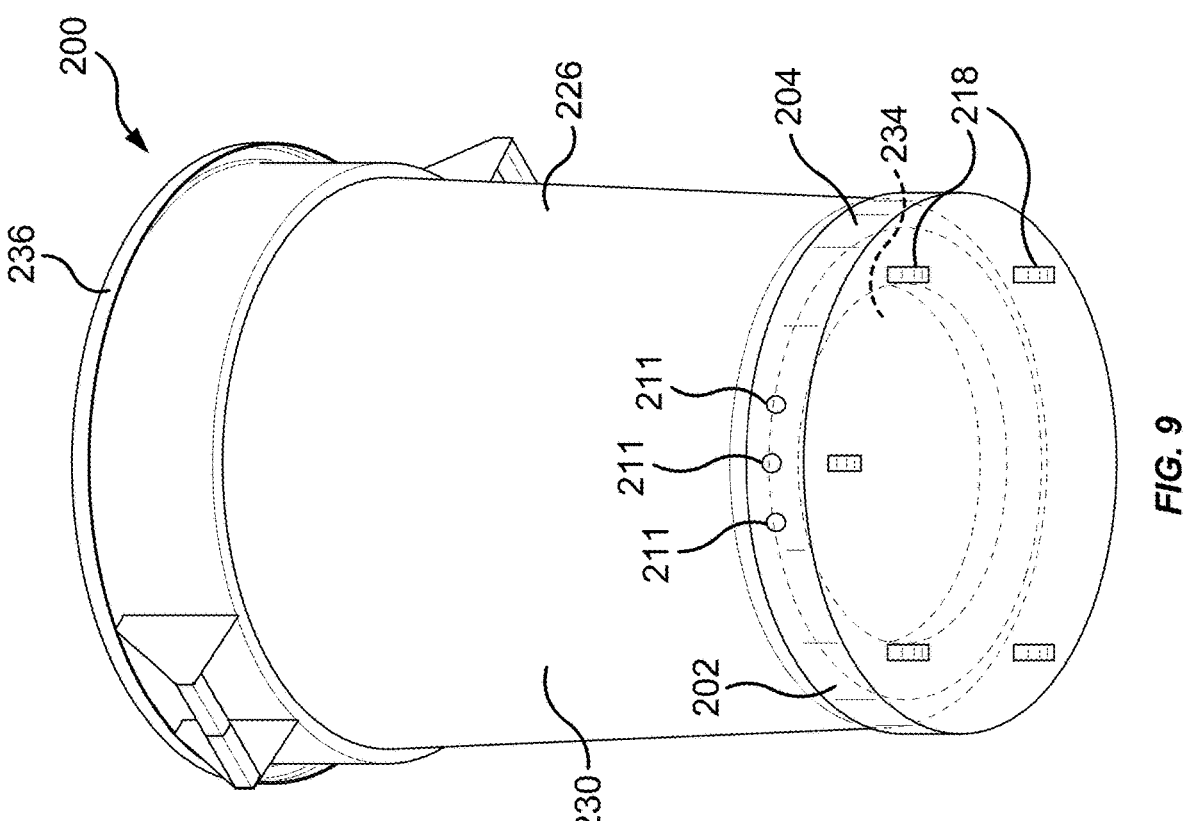
FIG. 9 is a bottom perspective view of a waste disposal system of an embodiment of the present invention, illustrating an exemplary garbage container and an exemplary robot attached to the garbage container.

FIG. 9 is a bottom perspective view of a waste disposal system 200 of an embodiment of the present invention. FIG. 10 is a front view of waste disposal system 200 of FIG. 9. Waste disposal system 200 includes a robot 202 and a garbage container 226. Robot 202 includes a housing 204 that houses internal components, such as a main board, a control unit including a processor and a memory, a navigation system, one or more internal sensors, a wireless communication unit, and a propulsion system. Robot 202 further includes external sensors 211 and wheels 218. Garbage container 226 includes a tubular shaped sidewall 230, an open top 236, and a bottom surface 234. Robot 202 is secured to bottom surface 234 of garbage container 226.

Control unit is configured to store a scheduler event and a return event in the memory. The scheduler event includes information pertaining to a day of the week and a time of the day. The return event can be a second scheduler event including information pertaining to a day of the week and a time of the day, where at least the time of the second scheduler event is different than the time of the scheduler event. The return event can be activated based on a motion sensor of sensors 211. Motion sensor detects motions that exceed a motion sensitivity threshold, and the return event occurs after a delay time following detection, by the motion sensor, of a motion that exceeds the motion sensitivity threshold. The return event can be activated based on a weight sensor of sensors 211. Weight sensor detects a maximum weight threshold, and the return event occurs after a delay time following detection, by the weight sensor, of a weight that is below the maximum weight threshold.

The control unit is further configured to store a navigation instruction in the memory, the navigation instruction including a first route that begins at a first location and ends at a trash pickup location and a second route that begins at the trash pickup location and ends at the first location. The navigation instruction can be determined by the navigation system. For example, the navigation system can include a global positioning system receiver that receives and saves coordinates of garbage container. The navigation system can utilize the one or more sensors to navigate the first route and the second route. The one or more sensors can also be used to generate the navigation instruction.

The control unit is further configured activate the propulsion system based on information provided by the navigation system to propel garbage container 226 along the first route of the navigation instruction such that garbage container 226 is propelled from the first location to the trash pickup location when the scheduler event occurs. Once the garbage truck empties the trash from garbage container 226 and the return event occurs, the control unit is further configured to activate propulsion system based on information provided by navigation system to propel garbage container 226 along the second route of the navigation instruction such that garbage container 226 is propelled from the trash pickup location to the first location.

Figures 11, 12:
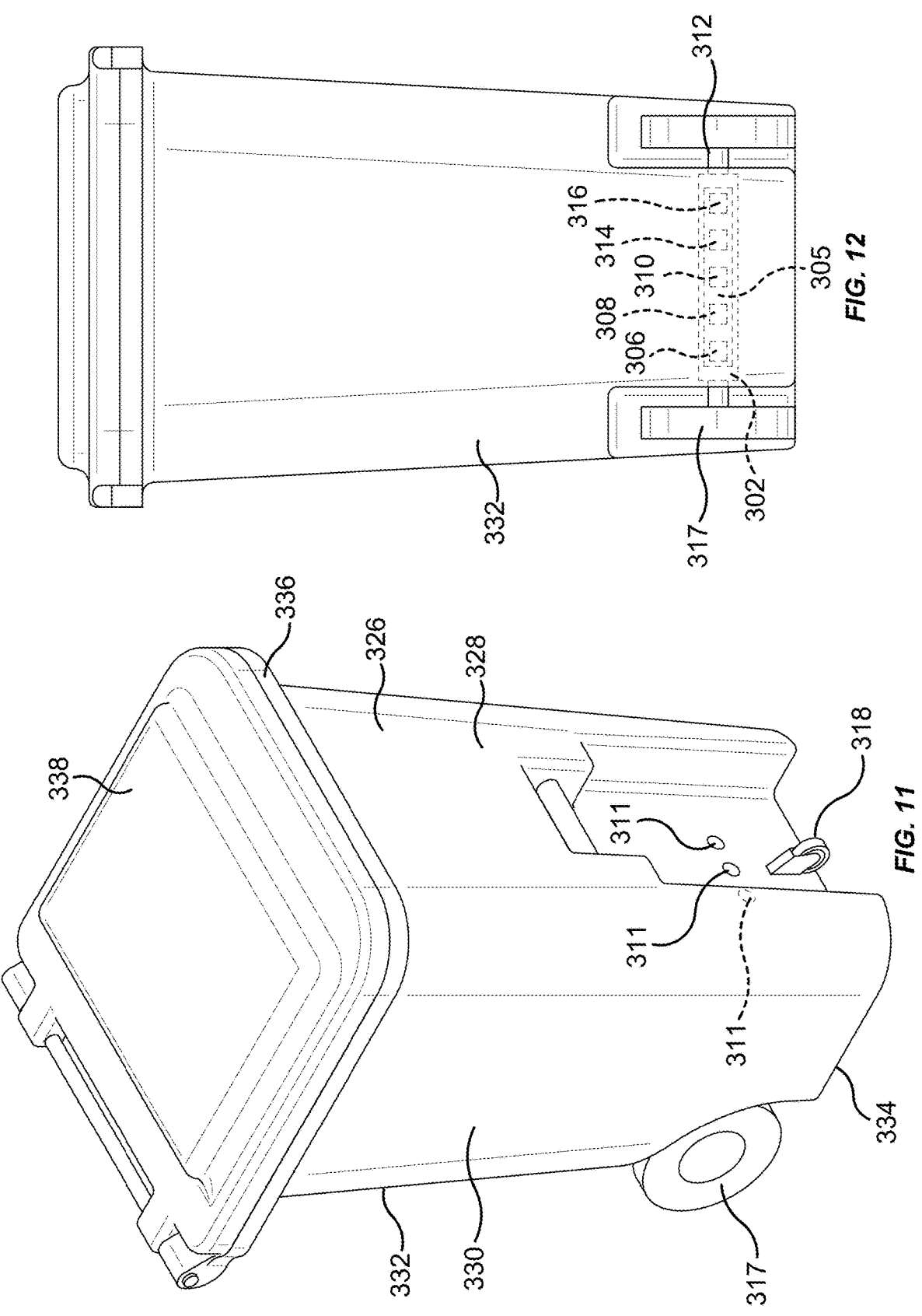
FIG. 11 is a perspective view of a waste disposal system of an embodiment of the present invention, illustrating an exemplary garbage container and an exemplary robot attached to the garbage container.
FIG. 12 is a rear view of the waste disposal system of FIG. 11.

FIG. 11 is a perspective view of a waste disposal system of an embodiment of the present invention, illustrating a garbage container 328 and a robot attached to garbage container 328. FIG. 12 is a rear view of the waste disposal system of FIG. 11, illustrating robot 302. Garbage container 326 includes a front wall 328, sidewalls 330, a rear wall 332, a bottom surface 334, a top 336, and an openable and closable lid 338. Robot 302 includes wheels 317 and a housing. A main board 305 is disposed within the housing. A control unit 306 including a processor and a memory, a navigation system 308, internal sensors 310, and a wireless communication unit 316 can be electrically connected to main board 305, and can be in communication with one another.

Robot 302 further includes a propulsion system 312 that drives wheels 317. Wheels 317 of robot 302 can be the same size or a similar size to the original wheels of garbage container 328. Wheels 317 of robot 302 can also pivot for steering. In such embodiments, robot 302 replaces the original wheels of garbage container 326. As an option, one or more add-on wheels 318 and/or one or more add-on sensors 311 in communication with robot 302 can be attached to garbage container 326. A power source 314 can also be connected to the main board 305 and can provide power to control unit 306, navigation system 308, internal sensors 310, add-on sensors 311, propulsion system 312, and wireless communication unit 316.

Control unit 306 is configured to store a scheduler event and a return event in the memory. The scheduler event includes information pertaining to a day of the week and a time of the day. The return event can be a second scheduler event including information pertaining to a day of the week and a time of the day, where at least the time of the second scheduler event is different than the time of the scheduler event. The return event can be activated based on a motion sensor of add-on sensors 311 and/or internal sensors 310. The motion sensor detects motions that exceed a motion sensitivity threshold, and the return event occurs after a delay time following detection, by the motion sensor, of a motion that exceeds the motion sensitivity threshold. The return event can be activated based on a weight sensor of add-on sensors 311 and/or internal sensors 310. Weight sensor detects a maximum weight threshold, and the return event occurs after a delay time following detection, by the weight sensor, of a weight that is below the maximum weight threshold.

Control unit 306 is further configured to store a navigation instruction in the memory, the navigation instruction including a first route that begins at a first location and ends at a trash pickup location and a second route that begins at the trash pickup location and ends at the first location. The navigation instruction can be determined by navigation system 308. For example, navigation system 308 can include a global positioning system receiver that receives and saves coordinates of garbage container. Navigation system 308 can utilize add-on sensors 311 and/or internal sensors 310 to navigate the first route and the second route. The add-on sensors 311 and/or internal sensors 310 can also be used to generate the navigation instruction.

Control unit 306 is further configured activate propulsion system 312 based on information provided by navigation system 308 to propel garbage container 326 along the first route of the navigation instruction such that garbage container 326 is propelled from the first location to the trash pickup location when the scheduler event occurs. Once the garbage truck empties the trash from garbage container 326 and the return event occurs, control unit 306 is further configured to activate propulsion system 312 based on information provided by navigation system 308 to propel garbage container 326 along the second route of the navigation instruction such that garbage container 326 is propelled from the trash pickup location to the first location.

The present invention includes the following aspects/embodiments/features in any order and/or in any combination:

1. A robot for waste disposal, the robot being configured to be secured to a garbage container and comprising:
   a propulsion system configured to move the garbage container when the robot is secured to the garbage container;
   a control unit comprising a processor and a memory, the control unit being configured to control the propulsion system;
   a navigation system in communication with the control unit; and
   at least one power source configured to power at least the propulsion system,
   wherein the control unit is further configured to:
      store a scheduler event in the memory, the scheduler event including information pertaining to a day of the week and a time of the day,
      store a navigation instruction in the memory, the navigation instruction comprising at least a first route that begins at a first location and ends at a trash pickup location, and
      activate the propulsion system based on information provided by the navigation system to propel the garbage container along the first route of the navigation instruction such that the garbage container is propelled from the first location to the trash pickup location when the scheduler event occurs.

2. The robot of any preceding or following embodiment/feature/aspect, wherein
   the control unit is further configured to store a return event in the memory,
   the navigation instruction further comprises a second route that begins at the trash pickup location and ends at the first location, and
   the control unit is further configured to activate the propulsion system based on information provided by the navigation system to propel the garbage container along the second route of the navigation instruction such that the garbage container is propelled from the trash pickup location to the first location when the return event occurs.

3. The robot of any preceding or following embodiment/feature/aspect, wherein the return event is a second scheduler event including information pertaining to a day of the week and a time of the day, wherein at least the time of the second scheduler event is different than the time of the scheduler event.

4. The robot of any preceding or following embodiment/feature/aspect, further comprising one or more sensors configured to send signals to the control unit, wherein the one or more sensors comprises a light sensor, a weight sensor, a motion sensor, a magnetic sensor, a sound sensor, a radio sensor, a wheel encoder, or a combination thereof.

5. The robot of any preceding or following embodiment/feature/aspect, wherein the navigation system comprises the one or more sensors and the one or more sensors are used to generate the navigation instruction.

6. The robot of any preceding or following embodiment/feature/aspect, further comprising a motion sensor configured to send signals to the control unit, wherein the motion sensor detects motions that exceed a motion sensitivity threshold, and the return event occurs after a delay time following detection, by the motion sensor, of a motion that exceeds the motion sensitivity threshold.

7. The robot of any preceding or following embodiment/feature/aspect, further comprising a weight sensor configured to send signals to the control unit, wherein the weight sensor detects a maximum weight threshold, and the return event occurs after a delay time following detection, by the weight sensor, of a weight that is below the maximum weight threshold.

8. The robot of any preceding or following embodiment/feature/aspect, wherein the navigation system comprises a global positioning system receiver.

9. The robot of any preceding or following embodiment/feature/aspect, wherein the propulsion system comprises a set of wheels.

10. The robot of any preceding or following embodiment/feature/aspect, wherein the set of wheels are operatively connected to an actuator, the actuator is configured to extend the set of wheels into a deployed position and retract the set of wheels into a retracted position, and the control unit is configured to:
   activate the actuator to extend the set of wheels into the deployed position when the scheduler event occurs,
   retract the set of wheels into the retracted position when the garbage container reaches the trash pickup location,
   extend the set of wheels to the deployed position when the return event occurs, and
   retract the set of wheels into the retracted position when the garbage container returns to the first location.

11. The robot of any preceding or following embodiment/feature/aspect, further comprising at least one wireless communication unit comprising a wireless network adapter, Bluetooth, a cellular adapter, or a combination thereof.

12. The robot of any preceding or following embodiment/feature/aspect, wherein the navigation instruction is received via the at least one wireless communication unit.

13. The robot of any preceding or following embodiment/feature/aspect, wherein the scheduler event is received via the at least one wireless communication unit.

14. The robot of any preceding or following embodiment/feature/aspect, wherein the at least one power source comprises a solar panel configured to charge a battery.

15. A garbage container system comprising a garbage container and the robot of any preceding or following embodiment/feature/aspect secured to the garbage container.

16. The garbage container system of any preceding or following embodiment/feature/aspect, wherein the garbage container comprises a front wall, sidewalls, a rear wall, a bottom surface, and a top having an openable and closable lid, wherein the front wall comprises a channel extending in a direction from the bottom surface to the open top and the robot is secured within the channel.

17. The garbage container system of any preceding or following embodiment/feature/aspect, wherein the robot is releasably secured within the channel by a locking bracket.

18. The garbage container system of any preceding or following embodiment/feature/aspect, further comprising a docking station configured to charge the at least one power source when the robot is docked at the docking station.

19. A method for waste disposal comprising:

securing a robot to a garbage container, the robot comprising a propulsion system, a control unit comprising a processor and a memory, a navigation system, and at least one power source;

storing a scheduler event in the memory, the scheduler event including information pertaining to a day of the week and a time of the day; and storing a navigation instruction in the memory, the navigation instruction comprising at least a first route that begins at a first location and ends at a trash pickup location, wherein the control unit activates the propulsion system based on information provided by the navigation system to propel the garbage container along the first route of the navigation instruction such that the garbage container is propelled from the first location to the trash pickup location when the scheduler event occurs.

20. A waste disposal system comprising:

a garbage container;

a propulsion system configured for moving the garbage container;

a control unit comprising a processor and a memory, the control unit being configured to control the propulsion system;

a navigation system in communication with the control unit; and at least one power source, wherein the control unit is further configured to:

store a scheduler event in the memory, the scheduler event indicating a day of the week and a time of the day, store a navigation instruction in the memory, the navigation instruction comprising at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

The entire contents of all references cited in this disclosure are incorporated herein in their entireties, by reference. Further, when an amount or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A robot for waste disposal, the robot being configured to be secured to a garbage container and comprising:

a propulsion system configured to move the garbage container when the robot is secured to the garbage container;

a control unit comprising a processor and a memory, the control unit being configured to control the propulsion system;

a navigation system in communication with the control unit;

at least one power source configured to power at least the propulsion system;

a housing accommodating at least the control unit, the navigation system, and the at least one power source; and a locking bracket configured to secure the housing to a front wall of the garbage container, wherein the control unit is further configured to:

store a scheduler event in the memory, the scheduler event including information pertaining to a day of the week and a time of the day, store a navigation instruction in the memory, the navigation instruction comprising at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

2. The robot of claim 1, wherein the control unit is further configured to store a return event in the memory, the navigation instruction further comprises a second route that begins at the trash pickup location and ends at the first location, and the control unit is further configured to activate the propulsion system based on information provided by the navigation system to propel the garbage container along the second route of the navigation instruction such that the garbage container is propelled from the trash pickup location to the first location when the return event occurs.

3. The robot of claim 2, wherein the return event is a second scheduler event including information pertaining to a day of the week and a time of the day, wherein at least the time of the second scheduler event is different than the time of the scheduler event.

4. The robot of claim 2, further comprising one or more sensors configured to send signals to the control unit, wherein the one or more sensors comprise a light sensor, a weight sensor, a motion sensor, a magnetic sensor, a sound sensor, a radio sensor, a wheel encoder, or a combination thereof.

5. The robot of claim 4, wherein the navigation system comprises the one or more sensors and the one or more sensors are used to generate the navigation instruction.

6. The robot of claim 2, further comprising a motion sensor configured to send signals to the control unit, wherein the motion sensor detects motions that exceed a motion sensitivity threshold, and the return event occurs after a delay time following detection, by the motion sensor, of a motion that exceeds the motion sensitivity threshold.

7. The robot of claim 2, further comprising a weight sensor configured to send signals to the control unit, wherein the weight sensor detects a maximum weight threshold, and the return event occurs after a delay time following detection, by the weight sensor, of a weight that is below the maximum weight threshold.

8. The robot of claim 1, wherein the navigation system comprises a global positioning system receiver.

9. The robot of claim 1, wherein the propulsion system comprises a set of wheels.

10. The robot of claim 9, wherein the set of wheels are operatively connected to an actuator, the actuator is configured to extend the set of wheels to an outside of the housing at a deployed position and retract the set of wheels into a retracted position within the housing, and the control unit is configured to:

activate the actuator to extend the set of wheels into the deployed position when the scheduler event occurs, retract the set of wheels into the retracted position when the garbage container reaches the trash pickup location, extend the set of wheels to the deployed position when the return event occurs, and retract the set of wheels into the retracted position when the garbage container returns to the first location.

11. The robot of claim 1, further comprising at least one wireless communication unit comprising a wireless network adapter, Bluetooth, a cellular adapter, or a combination thereof.

12. The robot of claim 11, wherein the navigation instruction is received via the at least one wireless communication unit.

13. The robot of claim 11, wherein the scheduler event is received via the at least one wireless communication unit.

14. The robot of claim 1, wherein the at least one power source comprises a solar panel configured to charge a battery.

15. The robot of claim 1, wherein the propulsion system comprises at least one wheel and the locking bracket is configured to secure the housing within a recessed channel of the front wall of the garbage container such that the propulsion system of the robot is configured to drive the garbage container system using the at least one wheel of the robot and a set of wheels of the garbage container.

16. A garbage container system comprising:

a garbage container comprising a front wall, sidewalls, a rear wall opposite the front wall, a bottom surface, a top having an openable and closable lid, and a set of wheels disposed at an intersection of the bottom surface and the rear wall, wherein the front wall comprises a recessed channel extending in a direction from the bottom surface to the open top; and a robot comprising:

a propulsion system comprising at least one wheel;

a control unit comprising a processor and a memory, the control unit being configured to control the propulsion system;

a navigation system in communication with the control unit; and at least one power source configured to power at least the propulsion system, wherein the robot is secured to the garbage container within the recessed channel of the garbage container such that the propulsion system of the robot is configured to drive the garbage container system using the at least one wheel of the robot and the set of wheels of the garbage container.

17. The garbage container system of claim 16, wherein the robot is releasably secured within the channel by a locking bracket.

18. The garbage container system of claim 16, further comprising a docking station configured to charge the at least one power source when the robot is docked at the docking station.

19. The garbage container system of claim 16, wherein the control unit is further configured to:

store a scheduler event in the memory, the scheduler event including information pertaining to a day of the week and a time of the day, store a navigation instruction in the memory, the navigation instruction comprising at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

20. A waste disposal system comprising:

a garbage container comprising a front wall, sidewalls, a rear wall opposite the front wall, a bottom surface, a top having an openable and closable lid, and a set of wheels disposed at an intersection of the bottom surface and the rear wall, the set of wheels connected by at least one axle;

a housing that accommodates:

a propulsion system configured for moving the garbage container;

a control unit comprising a processor and a memory, the control unit being configured to control the propulsion system;

a navigation system in communication with the control unit; and at least one power source, wherein the housing is part of the at least one axle of the garbage container, and the control unit is further configured to:

store a scheduler event in the memory, the scheduler event indicating a day of the week and a time of the day, store a navigation instruction in the memory, the navigation instruction comprising at least a first route that begins at a first location and ends at a trash pickup location, and activate the propulsion system based on information provided by the navigation system to propel the garbage container along the first route of the navigation instruction such that the garbage container is propelled from the first location to the trash pickup location when the scheduler event occurs.

\* \* \* \* \*